May 22, 1945.   F. D. JOHNSON   2,376,774
ELECTRICAL DISTRIBUTION SYSTEM
Filed Oct. 28, 1942
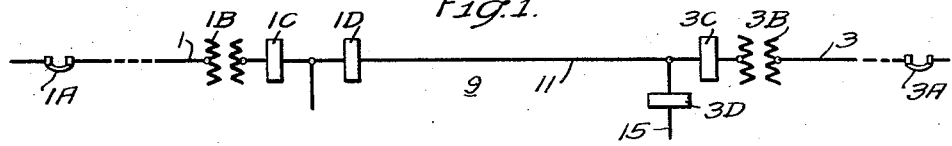
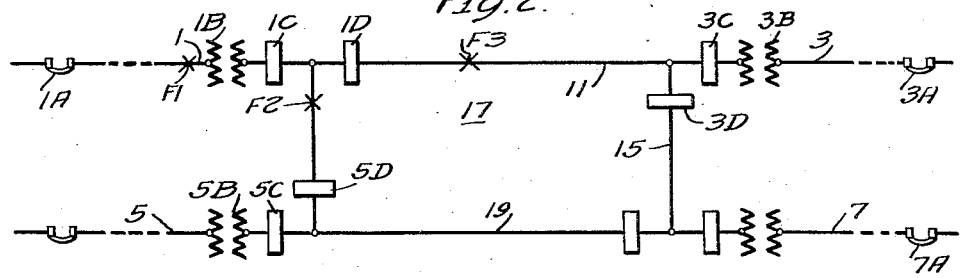
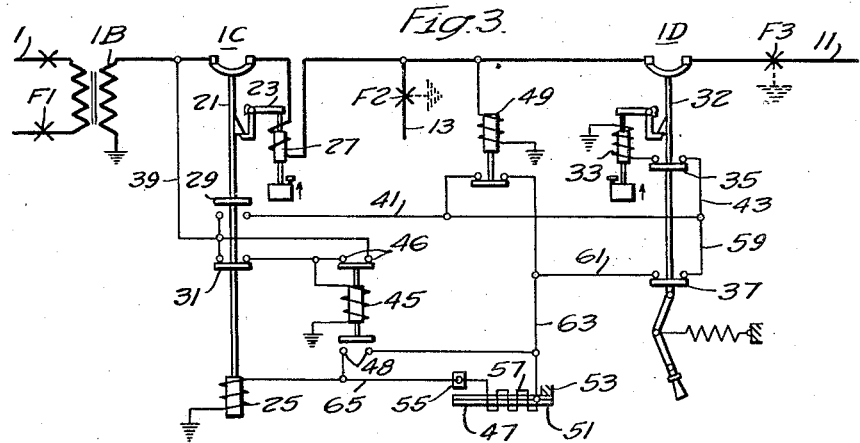
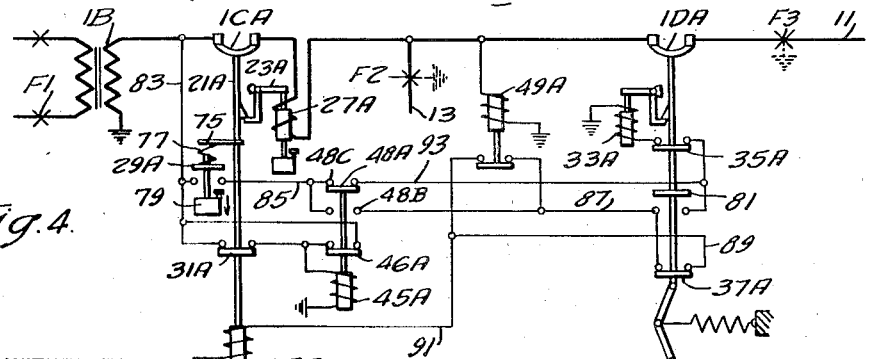
WITNESSES:
INVENTOR
Floyd D. Johnson
BY
ATTORNEY Patented May 22, 1945

2,376,774

UNITED STATES PATENT OFFICE 2,376,774

ELECTRICAL DISTRIBUTION SYSTEM

Floyd D. Johnson, Forest Hills, Pa., assignor to Westinghouse Electric & Manufacturing Company, East Pittsburgh, Pa., a corporation of Pennsylvania Application October 28, 1942, Serial No. 463,638

9 Claims. (Cl. 175—294)

This invention relates to electrical systems and it has particular relation to network systems wherein a network distribution circuit or grid is supplied with electrical energy from a plurality of sources of electrical energy.

In a conventional network system suitable for distributing low voltage electrical energy to urban areas, a network distribution circuit or grid is supplied with electrical energy from a plurality of feeder circuits. When a fault occurs on one of the feeder circuits, the faulty feeder circuit is disconnected from the distribution circuit or grid by operation of associated network protectors. Such network protectors may be controlled by directional relays. Should a fault occur on a distribution circuit or grid, all feeder circuits remain connected to that distribution circuit or grid and the fault is burned clear.

For application to medium or low density areas, some modifications of the system described in the preceding paragraph may be desirable. For example, sufficient current may not be available for burning clear faults occurring on the distribution circuit or grid. In addition, some simplification in relay design is desirable for medium and low density network installation.

In accordance with the invention, a distribution circuit is supplied with electrical energy from a plurality of feeder circuits, each of which is connected to the distribution circuit through a feeder-circuit-interrupter-unit. In addition, a sectionalizing-circuit-interrupting-unit is positioned in the distributor circuit between each pair of points of connection thereto of the feeder circuits. Preferably, the circuit-interrupter-units are arranged in pairs, each including one of the feeder-circuit-interrupting-units and an adjacent sectionalizing-circuit-interrupter-unit. The units in each pair are so related that the sectionalizing-circuit-interrupter-unit can trip only after its associated feeder-circuit-interrupter-unit has tripped. Furthermore, each feeder-circuit-interrupter-unit may be reclosed if its associated sectionalizing-circuit-interrupter-unit is reclosed or the distribution circuit adjacent the feeder circuit interrupter unit is energized. In a system embodying the invention, proper discrimination between feeder circuit and distribution circuit faults is obtained without recourse to complicated control relays.

It is therefore an object of the invention to provide an improved network system particularly suitable for medium and low density load areas.

It is a further object of the invention to provide a network system wherein feeder-circuit-interrupter-units and sectionalizing-circuit-interrupter-units are arranged in pairs to permit tripping of a sectionalizing-circuit-interrupter-unit only after an associated feeder-circuit-interrupter-unit has tripped.

It is a still further object of the invention to provide a network system wherein a plurality of feeder circuits supply electrical energy through feeder-circuit-interrupter-units to a distribution circuit having a sectionalizing-circuit-interrupter-unit positioned between each pair of points of connection thereto of the feeder circuits, and wherein each of the sectionalizing-circuit-interrupter-units may be tripped only after the tripping of an adjacent feeder-circuit-interrupter-unit, each of the feeder-circuit-interrupter-units being designed to reclose if its associated sectionalizing-circuit-interrupter-unit is closed or the distribution circuit adjacent thereto is energized and the associated feeder circuit also is energized.

Other objects of the invention will be apparent from the following description taken in conjunction with the accompanying drawing in which:

Figure 1 is a schematic view in single line of an electrical system embodying the invention;

Fig. 2 is a schematic view in single line showing the association of a plurality of systems similar to that of Fig. 1 to form a composite resultant system;

Fig. 3 is a schematic view in greater detail showing a portion of a system suitable for the systems of Figs. 1 and 2; and Fig. 4 is a schematic view showing a modification of the portion of the system illustrated in Fig. 3.

Referring to the drawing, Figure 1 shows an electrical system including a pair of feeder circuits 1 and 3 which are connected to suitable generating stations through station-circuit-interrupters 1A and 3A, respectively. The system of Fig. 1 may be designed for direct current or for alternating current of any desired frequency and number of phases, but to simplify the presentation of the invention, it is assumed that the systems illustrated in the drawing are single-phase alternating-current systems designed for operation at a suitable frequency such as 60 cycles per second. The station-circuit-interrupters 1A and 3A may be of any suitable conventional construction. If the feeder circuits are subject to faults of a self-clearing type, the station-circuit-interrupters 1A and 3A conveniently may be of a standard reclosing type, wherein in response to a fault each of the circuit interrupters trips and recloses a predetermined number of times. If the fault on a feeder circuit fails to clear within the reclosing cycle of its associated station-circuit-interrupter, the station circuit interrupter finally locks out in open position.

Each of the feeder circuits is coupled to a network distribution circuit or grid 9 through suitable coupling units. For the purpose of identification, corresponding units associated with each feeder circuit are identified by the numeral identifying the feeder circuit having added thereto an appropriate letter. The feeder circuit 1 is coupled to the distribution circuit 9 through a transformer 1B and a feeder-circuit-interrupter-unit 1C. In a similar manner, the feeder circuit 3 is coupled to the distribution circuit 9 through a transformer 3B and a feeder-circuit-interrupter-unit 3C.

In Fig. 1 the distribution circuit 9 includes a secondary main 11 having connected thereto additional secondary mains 13 and 15. Each of the secondary mains is sectionalized by means of a sectionalizing-circuit-interrupter-unit. For example, the secondary main 11 is provided with a sectionalizing-circuit-interrupter-unit 1D. Although the sectionalizing-circuit-interrupter-unit 1D may be positioned at various points along the secondary main 11, preferably the unit is positioned adjacent the transformer 1B and the feeder-circuit-interrupter-unit 1C. Conveniently, the transformer and the two units may be mounted in a single enclosure or housing. In a similar manner, the secondary main 15 has associated therewith a sectionalizing-circuit-interrupter-unit 3D which may be mounted with the transformer 3B and the feeder-circuit-interrupter-unit 3C in a common enclosure or housing.

If only two feeder circuits are provided, it may be desirable to omit the secondary mains 13 and 15 together with the sectionalizing-circuit-interrupter-unit 3D and to connect all electrical loads to the single secondary main 11. However, if additional feeder circuits are available, it is convenient to associate two or more systems similar to that of Fig. 1 to provide a distribution circuit in the form of a mesh or loop. For example, Fig. 2 shows a distribution circuit in the form of a loop 17.

Referring to Fig. 2, it will be observed that the system of Fig. 2 includes not only the system of Fig. 1, but an additional similar system having feeder circuits 5 and 7. The notation employed for designating the various electrical units associated with the feeder circuits 5 and 7 will be understood from the foregoing discussion. In Fig. 2 a secondary main 19 completes with the secondary mains 11, 13 and 15 the loop distribution circuit 17. The advantages of such a loop distribution circuit are set forth in the copending Parsons application Serial No. 342,938, filed June 28, 1940, which has issued as Patent No. 2,317,552.

As previously pointed out, the circuit-interrupter-units are arranged in pairs each including a feeder-circuit-interrupter-unit and a sectionalizing-circuit-interrupter-unit. Since these pairs all may be similar in construction, a detailed discussion of one of the pairs suffices for the entire system of Fig. 2. To this end the circuit-interrupter-units 1C and 1D are shown in greater detail in Fig. 3.

In Fig. 3 the secondary of the transformer 1B is illustrated as having one terminal grounded in order to simplify the figure. The feeder-circuit-interrupter-unit 1C includes a feeder-circuit-interrupter 21 having a tripping latch 23 and a closing motor or solenoid 25. The tripping latch 23 may be actuated in any desired manner in response to any variable quantity present on the associated system. For the purpose of discussion, it is assumed that the tripping latch 23 is actuated by overcurrent responsive mechanism preferably operating with inverse time delay. Such mechanism is illustrated in Fig. 3 by a tripping solenoid 27 having its energizing winding connected in series with the poles of the circuit interrupter 21. The feeder-circuit-interrupter-unit 1C also includes a pallet switch 29 having back contacts which are closed when the circuit interrupter is opened. An additional pallet switch 31 is also operated by the circuit interrupter 21 and has front contacts which are closed when the circuit interrupter 21 is closed.

The sectionalizing-circuit-interrupter-unit 1D includes a circuit interrupter 32 having a tripping solenoid 33 preferably operating with slight time delay. This circuit interrupter conveniently may be of the manually reclosed type. As shown in Fig. 3, the sectionalizing circuit interrupter 1D has two pallet switches 35 and 37, each having front contacts which are closed when the sectionalizing-circuit-interrupter is closed.

Tripping of the sectionalizing-circuit-interrupter 32 is controlled by the associated feeder-circuit-interrupter 21. When the feeder-circuit-interrupter 21 trips, an energizing circuit is established for the tripping solenoid 33 of the sectionalizing-circuit-interrupter 32 which may be traced from the terminal of the secondary winding of the transformer 1B through a conductor 39, the pallet switch 29, a conductor 41, a conductor 43, the pallet switch 35 and the energizing winding of the tripping solenoid 33 to ground. Consequently tripping of the feeder-circuit-interrupter 21 connects the energizing winding of the tripping solenoid 33 across the secondary winding of the transformer 1B. If voltage is present across this secondary winding, the sectionalizing-circuit-interrupter 32 trips after a small time delay. As previously pointed out, the sectionalizing-circuit-interrupter 32 may be manually reclosed.

Reclosure of the feeder-circuit-interrupter 21 is controlled in part by a by-pass relay 45, a time-delay-relay 47 and a voltage-responsive-relay 49. The by-pass relay 45 has an energizing winding which is connected through the pallet switch 31 and the conductor 39 across the secondary winding of the transformer 1B. When the by-pass relay 45 picks up, it closes a pair of front contacts 46 which establish a holding circuit to retain the by-pass relay 45 in its picked-up condition regardless of the position of the associated pallet switch 31. When the by-pass relay 45 is in its deenergized condition, it closes a pair of back contacts 48 to establish a by-pass for the time-delay-relay 47.

The time-delay-relay 47 may take the form of a bimetallic element 51 having one end fixed to a stationary support 53 and having its other end movable into engagement with a fixed contact 55. Heat is applied to the bimetallic element by means of a heating resistor 57 having a resistance sufficiently high to restrict current passing therethrough to a value insufficient to operate the closing solenoid 25.

Assuming that the parts are in the positions illustrated in Fig. 3, if the feeder-circuit-interrupter 21 trips, a closing circuit is established for the closing solenoid 25 which may be traced from one terminal of the secondary winding of the transformer IB through the conductor 39, the pallet switch 29, the conductor 41, a conductor 59, the pallet switch 37, a conductor 61, a conductor 63, the resistor 57, a conductor 65 and the energizing winding of the closing solenoid 25 to ground. Because of the presence of the resistor 57 in this circuit, sufficient current cannot pass therethrough to operate the closing solenoid 25. In response to the heat developed by current passing through the resistor 57, the bimetallic element 51 deflects after a predetermined time delay into engagement with the fixed contact 55. Such movement of the bimetallic element bypasses the resistor 57 and permits passage of sufficient current to actuate the closing solenoid 25.

By inspection of Fig. 3, it will be observed that the energizing winding of the voltage-responsive-relay 49 is energized in accordance with the voltage between the secondary main 13 and ground. This relay has front contacts which are in parallel with the contacts of the pallet switch 37 and serve to complete an energizing circuit for the closing solenoid 25 independent of the pallet switch 37.

With the description of the various parts in mind, it is believed that a review of the operation of the system illustrated in Fig. 2 would assist in showing the relationship between the various parts. Let it be assumed first that the system of Fig. 2 is in normal operation with all circuit interrupters closed and all feeder circuits energized. Under these circumstances, the circuit-interrupter-units IC and ID are as illustrated in Fig. 3. If a fault F1 occurs on the feeder circuit 1, excessive current flows thereto through the station-circuit-interrupter 1A. In response to this excessive flow of current, the station-circuit-interrupter 1A trips and enters its reclosing cycle. If the fault clears before completion of this reclosing cycle, the station-circuit-interrupter closes and remains closed. However, if the fault is of a permanent nature the station-circuit-interrupter 1A finally trips and remains locked out. At the same time current is supplied to the fault F1 from the distribution circuit 17. In response to the excessive flow of current through the feeder-circuit-interrupter-unit IC the circuit interrupter 21 thereof trips to disconnect the feeder circuit 1 from the distribution circuit 17. It should be noted that for the fault F1 the entire fault current passes through the single feeder-circuit-interrupter-unit IC whereas the fault current divides among the remaining feeder-circuit-interrupter-units. Since the feeder-circuit-interrupters trip with inverse time delay, it follows that the feeder-circuit-interrupter-unit IC trips to clear the fault from the remainder of the system before other feeder-circuit-interrupter-units trip.

In tripping, the circuit interrupter 21 of the feeder circuit interrupter IC completes a tripping circuit for the associated sectionalizing circuit interrupter unit which may be traced from one terminal of the transformer IB through the conductor 39, the pallet switch 29, the conductors 41 and 43, the pallet switch 35 and the energizing winding of the tripping solenoid 33 to ground. However, since no voltage appears across the secondary winding of the transformer IB, the circuit interrupter of the unit ID remains closed. To provide adequate time for the deenergization of the feeder circuit 1, the tripping solenoid 33 may be provided with a slight time delay in tripping.

Since no voltage appears across the secondary winding of the transformer IB, the by-pass relay 45 drops to close its back contacts 48 thereby by-passing the time-delay-relay 47. Therefore the only effect of the fault F1 on the operation of the system is to remove the feeder circuit 1 from service. The distribution circuit 17 continues to receive energy from the feeder circuits 3, 5 and 7.

After the feeder circuit 1 has been repaired, the station-circuit-interrupter 1A is closed. Such closure results in a voltage across the secondary winding of the transformer IB and energizes the closing solenoid 25 to close the circuit interrupter 21. Since the by-pass relay 45 by-passes the time delay relay 47, the circuit interrupter 21 closes promptly. The time delay provided for the tripping solenoid 33 prevents a tripping operation of the sectionalizing-circuit-interrupter prior to reclosure of the circuit interrupter 21.

Reclosure of the circuit interrupter 21 also closes the contacts of the pallet switch 31 to energize the by-pass relay 45. Therefore the by-pass relay picks up to close its holding contacts 46 and the entire system is restored to its normal operating condition.

Let it be assumed next that with the system operating in its normal condition, a fault F2 occurs on the secondary main 13. Since the feeder-circuit-interrupters trip with inverse time delay, the feeder-circuit-interrupter-units IC and 5C nearer to the fault trip. Considering first the operation of the feeder-circuit-interrupter-unit IC, it will be observed that tripping of the circuit interrupter 21 again completes an energizing circuit for the tripping solenoid 33. Since voltage is present across the secondary winding of the transformer IB, the tripping solenoid 33 at the expiration of its time delay operates to disconnect the fault F2 from the secondary main 11. It may be observed also that since voltage is present at the transformer IB the holding circuit of the by-pass relay 45 retains this relay in its picked-up condition. Therefore reclosure of the circuit interrupter 21 is delayed by the time-delay-relay 47 for a time sufficient to permit prior tripping of the circuit interrupter 32.

In a similar manner, tripping of the feeder-circuit-interrupter-unit 5C results in tripping of the associated sectionalizing-circuit-interrupter-unit 5D. Consequently the fault F2 is disconnected from the feeder circuit 5 and from the secondary main 19.

Since no voltage is available on the sectionalizing main 13, the voltage-responsive-relay 49 drops to open its front contacts. Since the contacts of the voltage-responsive-relay and the contacts of the pallet switch 37 are open, the circuit interrupter 21 cannot be reclosed. Therefore the feeder circuit 1 remains disconnected from the distribution circuit 17 until the fault is repaired and the sectionalizing-circuit-interrupter-unit ID is manually reclosed. Reclosure of the sectionalizing-circuit-interrupter-unit ID restores voltage to the secondary main 13 and causes the voltage responsive relay 49 to pick up and close its front contacts. Since an energizing circuit is completed for the closing solenoid 25 through the contacts of the voltage responsive relay 49 or the pallet switch 37, the circuit interrupter 21 closes to reconnect the feeder circuit to the distribution circuit. It should be observed that such reclosure requires a time delay equal to that provided by the time delay relay 47.

Since the fault F2 is cleared from the secondary main 19 and the feeder circuit 5 by the opening of the sectionalizing-circuit-interrupter-unit 5D, it is desirable that the feeder-circuit-interrupter-unit 5C reclose as promptly as possible after the sectionalizing-circuit-interrupter-unit 5D has opened. Since the voltage-responsive-relay 49 of the feeder-circuit-interrupter-unit 5C is energized from the secondary main 19, its contacts remain closed and establish an energizing circuit for the closing solenoid of the feeder-circuit-interrupter-unit 5C. Therefore this circuit interrupter unit recloses and restores the entire system for normal operation with the exception of the portion positioned between the transformer IB and the sectionalizing-circuit-interrupter-units ID and 5D. The operation of the feeder-circuit-interrupter-unit 5C under these conditions may be understood more clearly by consideration of a fault F3 occurring on the secondary main 11. This fault bears the same relationship to the circuit-interrupter-units IC and ID that the fault F2 bears to the circuit-interrupter-units 5C and 5D. Therefore the performance of the circuit-interrupter-units IC and ID in response to the fault F3 is similar to the performance of the circuit-interrupter-units 5C and 5D for the fault F2.

In response to the fault F3, the circuit-interrupter-units 3C and 3D trip in the same manner discussed for the circuit-interrupter-units IC and ID to disconnect the fault from the transformer 3B and the secondary main 15. In addition, the excessive current supplied to the fault F3 from the transformer IB trips the feeder-circuit-interrupter-unit IC and its associated sectionalizing-circuit-interrupter-unit ID in the manner heretofore discussed to clear the fault F3 from the secondary main 13 and the transformer IB. Since the fault F3 is cleared from the secondary main 13 by the tripping of the sectionalizing circuit interrupter unit ID, voltage remains on the secondary main 13 and the associated voltage-responsive relay 49 remains in its picked-up condition. For this reason a closing circuit is established for the closing solenoid of the feeder-circuit-interrupter-unit IC which may be traced from one terminal of the secondary winding of the transformer IB through the conductor 39, the pallet switch 29, the conductor 41, the front contacts of the voltage-responsive-relay 49, the conductor 63, the resistor 57, the conductor 65 and the winding of the closing solenoid 25 to ground. As previously explained, the resistor prevents the passage of sufficient current to actuate the closing solenoid 25, but at the expiration of the time delay required for the bimetallic element 51 to engage the fixed contact 55, the resistor 57 is by-passed and sufficient current passes to close the circuit interrupter 21. Therefore the circuit interrupter recloses to energize the secondary main 13 from the transformer IB. Under these circumstances the entire system of Fig. 2 remains in operation with the exception of that portion included between the circuit interrupters ID, 3C and 3D.

If the entire system is deenergized and the sectionalizing-circuit-interrupters are closed, energization of any feeder circuit results in closure of the associated feeder-circuit-interrupter. For example, a closing circuit for the closing solenoid 25 may be traced from one terminal of the secondary winding of the transformer IB through the conductor 39, the pallet switch 29, the conductors 41, 59, the pallet switch 37, the conductors 61, 63, the contacts 48 and the energizing winding of the closing solenoid 25 to ground.

In Fig. 4, a modification is illustrated in which parts similar to corresponding parts of Fig. 3 are identified by the same reference character followed by the letter "A." In Fig. 4 a feeder-circuit-interrupter-unit ICA and a sectionalizing-circuit-interrupter-unit IDA are associated with the feeder circuit I, the transformer IB and the secondary mains II and I3. The feeder-circuit-interrupter-unit ICA includes a circuit interrupter 21A. The only difference between this circuit interrupter and the circuit interrupter 21 of Fig. 3 resides in the construction of the switch 29A. In Fig. 4 the switch 29A lags opening movements of the circuit interrupter 21A. Such lagging may be produced by coupling the switch 29A to an arm 75 carried by the circuit interrupter 21A through a resilient coupling such as a spring 77. The switch 29A also is provided with a time delay in its contact-closing direction of operation as represented by a conventional dashpot symbol 79. With such a construction the switch 29A lags behind opening movements of the interrupter 21A for a time determined by the dashpot 79.

The sectionalizing-circuit-interrupter-unit IDA is similar in construction to the corresponding unit ID of Fig. 3 except for the addition of a pallet switch 81 having back contacts associated therewith. The relay 45A of Fig. 4 is similar to the relay 45 of Fig. 3 except for the replacement of the back contacts of the relay 45 by a movable contact member 48A which may engage either back contacts 48B or front contacts 48C, depending on the condition of the relay 45A. With the construction shown in Fig. 4, the tripping solenoid 33A need not be provided with a time delay. It is believed that the modification of Fig. 4 may be understood more clearly by a brief description of the operation thereof under conditions similar to those discussed for the modification of Fig. 3.

With the parts in the positions illustrated in Fig. 4, the occurrence of a fault on the feeder circuit I results in a tripping operation of the associated station-circuit-interrupter IA in the manner previously described with reference to Fig. 3. In addition, current supplied to the fault through the transformer IB trips the circuit interrupter 21A. The tripping of the circuit interrupter 21A is not followed immediately by closure of the switch 29A for the reason that this switch lags behind movements of the circuit interrupter. This delay is sufficient to permit deenergization of the associated feeder circuit I prior to closure of the switch 29A. Loss of voltage at the transformer IB results in deenergization of the relay 45A. Consequently the contact member 48A drops to engage its back contacts 48B. This completes an energizing circuit for the closing solenoid 25A which may be traced from one terminal of the secondary winding of the transformer IB through a conductor 83, the switch 29A, a conductor 85, the back contacts 48B, a conductor 87, the pallet switch 37A, a conductor 89, a conductor 91, and the energizing winding of the closing solenoid 25A to ground. Since the contacts of the voltage-responsive-relay 49A are in parallel with the pallet switch 37A, current to the closing solenoid 25A may flow through the contacts of the voltage-responsive-relay.

Although an energizing circuit is completed for the closing solenoid 25A, the circuit interrupter 21A fails to close because no voltage is available across the secondary winding of the transformer 1B. Therefore the system continues in operation except for the faulty feeder circuit 1 which is removed from service.

After the feeder circuit 1 has been repaired and the station-circuit-interrupter 1A closed, voltage appears across the secondary winding of the transformer 1B. In response to this voltage, current flows through the energizing winding of the solenoid 25A to close the circuit interrupter 21A. In addition, the reappearance of voltage energizes the relay 45A and establishes a holding circuit therefor. The switch 29A moves to the position illustrated in Fig. 4 and the entire system is restored for normal operation.

In response to the fault F2 on the secondary main 13, the circuit interrupter 21A trips by operation of its latch 23A. After the expiration of its time delay switch 29A closes to establish an energizing circuit for the solenoid 33A. Since voltage is present on the feeder circuit 1, the tripping solenoid 33A is energized to trip the sectionalizing-circuit-interrupter-unit 1DA. Therefore the fault F2 is cleared from the transformer 1B and from the secondary main 11. In a similar manner the feeder-circuit-interrupter unit 5C and the sectionalizing-circuit-interrupter-unit 5D, if similar in construction to the modification of Fig. 4, trip to disconnect the fault from the secondary main 19 and the transformer 5B. Since the secondary main 13 no longer is energized, the voltage-responsive-relay 49A associated therewith drops to open its front contacts. Thereafter the system continues in operation with the circuit-interrupter-units 1CA and 1DA open until the fault F2 is repaired and the circuit-interrupter-unit 1DA is manually reclosed.

For a fault F2 on the secondary main 13, the feeder-circuit-interrupter 5C, if it is similar in construction to the modification of Fig. 4, recloses to energize the secondary main 19 from the feeder circuit 5. This reclosure is effected for the reason that the associated voltage-responsive-relay 49A is energized to establish a closing circuit for the feeder-circuit-interrupter. This operation will be understood more clearly by a consideration of the effect of a fault F3 on a secondary main 11 on the performance of the circuit-interrupter-units 1CA and 1DA.

When a fault F3 occurs on the secondary main 11, the feeder-circuit-interrupter-unit 1CA trips, and after the expiration of its time delay the switch 29A closes to complete a tripping circuit for the associated sectionalizing-circuit-interrupter-unit 1DA. In a somewhat similar manner, the circuit interrupter units corresponding to units 3C and 3D trip to clear the fault F3 from the remainder of the system. It will be observed, however, that with the fault F3 on the secondary main 11 the secondary main 13 remains energized and the associated voltage-responsive-relay 49A remains in its picked-up condition. This establishes a reclosing circuit for the circuit interrupter 21A which may be traced from one terminal of the secondary winding of the transformer 1B through the conductor 83, the switch 29A, the conductor 85, the front contacts 48C of the relay 45A which remains in its picked-up condition, the conductor 93, the pallet switch 81, the conductor 87, the contacts of the voltage-responsive-relay 49A, the conductor 91 and the energizing winding of the closing solenoid 25A to ground. Therefore the feeder-circuit-interrupter 21A closes to energize the secondary main 13 from the transformer 1B. The remaining circuit-interrupter-units 1DA, 3CA and 3DA (which correspond to the units 1D, 3C and 3D of Fig. 2) remain open until the fault F3 is repaired and circuit-interrupter-units 3CA and 3DA are manually reclosed.

As previously explained, each feeder-circuit-interrupter-unit and its associated sectionalizing-circuit-interrupter-unit may be similar in construction to the remaining pairs of feeder and sectionalizing circuit-interrupter-units. Despite the fact that simple and sturdy relays are used throughout the systems herein discussed, proper discrimination is obtained between faults occurring on the feeder circuits and faults occurring on the distribution circuit.

Although the invention has been described with reference to certain specific embodiments thereof, numerous modifications thereof are possible. Therefore the specification is to be restricted only by the appended claims.

I claim as my invention:

1. In an electrical distribution system, a plurality of feeder circuits, a closed-loop distribution circuit connecting said feeder circuits, a separate feeder-circuit-interrupter for controlling the connection of each of said feeder circuits to said closed-loop distribution circuit, a sectionalizing-circuit-interrupter in said closed-loop distribution circuit between each pair of connections thereto of said feeder circuits, means responsive to the condition of said system when a fault occurs thereon for tripping the feeder-circuit-interrupter or feeder-circuit-interrupters adjacent said fault to disconnect the associated feeder circuit or feeder circuits from said closed-loop distribution circuit, and means responsive to the tripping of one of said feeder-circuit-interrupters for tripping an adjacent sectionalizing-circuit-interrupter.

2. In an electrical distribution system, a plurality of feeder circuits, a distribution circuit connecting said feeder circuits, a separate feeder-circuit-interrupter for controlling the connection of each of said feeder circuits to said distribution circuit, a sectionalizing-circuit-interrupter in said distribution circuit between each pair of connections thereto of said feeder circuits, means responsive to the condition of said system when a fault occurs thereon for tripping the feeder-circuit-interrupter or feeder-circuit-interrupters adjacent said fault to disconnect the associated feeder circuit or feeder circuits from said distribution circuit, and means responsive to the tripping of one of said feeder-circuit-interrupters and effective only if voltage is present on the associated feeder circuit for tripping an adjacent one of said sectionalizing-circuit-interrupters.

3. In an electrical distribution system, a plurality of feeder circuits, a distribution circuit connecting said feeder circuits, a separate feeder-circuit-interrupter for controlling the connection of each of said feeder circuits to said distribution circuit, a sectionalizing-circuit-interrupter in said distribution circuit between each pair of connections thereto of said feeder circuits, means responsive to the condition of said system when a fault occurs thereon for tripping the feeder-circuit-interrupter or feeder-circuit-interrupters adjacent said fault to disconnect the associated feeder circuit or feeder circuits from said distribution circuit, means responsive to the tripping of one of said feeder-circuit-interrupters and effective only if voltage is present on the associated feeder circuit for tripping an adjacent one of said sectionalizing-circuit-interrupters, and means responsive to the presence of voltage on a disconnected one of said feeder circuits for closing the associated feeder-circuit-interrupter.

4. In an electrical distribution system, a plurality of feeder circuits, a distribution circuit connecting said feeder circuits, a separate feeder-circuit-interrupter for controlling the connection of each of said feeder circuits to said distribution circuit, a sectionalizing-circuit-interrupter in said distribution circuit between each pair of connections thereto of said feeder circuits, means responsive to the condition of said system when a fault occurs thereon for tripping the feeder-circuit-interrupter or feeder-circuit-interrupters adjacent said fault to disconnect the associated feeder circuit or feeder circuits from said distribution circuit, means responsive to the tripping of one of said feeder-circuit-interrupters and effective only if voltage is present on the associated feeder circuit for tripping an adjacent one of said sectionalizing-circuit-interrupters, means responsive to the presence of voltage on a disconnected one of said feeder circuits for closing the associated feeder-circuit-interrupter, and means permitting reclosure of a tripped one of said feeder-circuit-interrupters only in the presence of either or both of two conditions wherein said distribution circuit is energized adjacent said tripped feeder-circuit-interrupter and the associated sectionalizing-circuit-interrupter is in closed condition.

5. In an electrical distribution system, a plurality of feeder circuits, a distribution circuit connecting said feeder circuits, a separate feeder-circuit-interrupter for controlling the connection of each of said feeder circuits to said distribution circuit, a separate sectionalizing-circuit-interrupter in said distribution circuit between each pair of connections thereto of said feeder circuits, said feeder circuit interrupters and said sectionalizing-circuit-interrupters being arranged in pairs each including one of said feeder-circuit-interrupters and an adjacent one of said sectionalizing-circuit-interrupters, and control means for each of said pairs of circuit interrupters, each of said control means including means responsive to current flowing through the associated feeder-circuit-interrupter for opening said associated feeder-circuit-interrupter, tripping means for the associated sectionalizing-circuit-interrupter, means responsive to an opening operation of said associated feeder-circuit-interrupter for connecting said tripping means for energization in accordance with a voltage quantity of the associated feeder circuit, means responsive to said voltage quantity for reclosing said associated feeder-circuit-interrupter, and means for delaying a tripping operation of said associated sectionalizing-circuit-interrupter for a time sufficient to permit a normal reclosing operation of said associated feeder-circuit-interrupter.

6. In an electrical distribution system, a plurality of feeder circuits, a distribution circuit connecting said feeder circuits, a separate feeder-circuit-interrupter for controlling the connection of each of said feeder circuits to said distribution circuit, a separate sectionalizing-circuit-interrupter in said distribution circuit between each pair of connections thereto of said feeder circuits, said feeder circuit interrupters and said sectionalizing-circuit-interrupters being arranged in pairs each including one of said feeder-circuit-interrupters and an adjacent one of said sectionalizing-circuit-interrupters, and control means for each of said pairs of circuit interrupters, each of said control means including means responsive to current flowing through the associated feeder-circuit-interrupter for opening said associated feeder-circuit-interrupter, tripping means for the associated sectionalizing-circuit-interrupter, means responsive to an opening operation of said associated feeder-circuit-interrupter for connecting said tripping means for energization in accordance with a voltage quantity of the associated feeder circuit, means responsive to said voltage quantity for reclosing said associated feeder-circuit-interrupter, and means responsive to presence of said voltage quantity immediately following an opening operation of said feeder-circuit-interrupter for maintaining said connection of said tripping means for a period sufficient to trip said sectionalizing-circuit-interrupter.

7. In an electrical distribution system, a plurality of feeder circuits, a distribution circuit connecting said feeder circuits, a separate feeder-circuit-interrupter for controlling the connection of each of said feeder circuits to said distribution circuit, a separate sectionalizing-circuit-interrupter in said distribution circuit between each pair of connections thereto of said feeder circuits, said feeder-circuit interrupters and said sectionalizing-circuit-interrupters being arranged in pairs each including one of said feeder-circuit-interrupters and an adjacent one of said sectionalizing-circuit-interrupters, and control means for each of said pairs of circuit interrupters, each of said control means including means responsive to current flowing through the associated feeder-circuit-interrupter for opening said associated feeder-circuit-interrupter, tripping means for the associated sectionalizing-circuit-interrupter, means responsive to an opening operation of said associated feeder-circuit-interrupter for connecting said tripping means for energization in accordance with a voltage quantity of the associated feeder circuit, means responsive to said voltage quantity for reclosing said associated feeder-circuit-interrupter, means responsive to presence of said voltage quantity immediately following an opening operation of said feeder-circuit-interrupter for maintaining said connection of said tripping means for a period sufficient to trip said sectionalizing-circuit-interrupter, and means responsive to deenergization of said associated feeder circuit and subsequent energization thereof for delaying a tripping operation of said sectionalizing-circuit-interrupter for a time sufficient to permit a normal closing operation of said associated feeder-circuit-interrupter.

8. In an electrical distribution system, a plurality of feeder circuits, a loop distribution circuit connecting said feeder circuits, a separate feeder-circuit-interrupter for controlling the connection of each of said feeder circuits to said distribution circuit, a separate sectionalizing-circuit-interrupter in said distribution circuit between each pair of connections thereto of said feeder circuits, said feeder-circuit interrupters and said sectionalizing-circuit-interrupters being arranged in pairs each including one of said feeder-circuit-interrupters and one of said sectionalizing-circuit-interrupters, and control means for each of said pairs of circuit interrupters, each of said control means including means responsive to current flowing through the associated feeder-circuit-interrupter for opening said associated feeder-circuit-interrupter, tripping means for the associated sectionalizing-circuit-interrupter, means responsive to an opening operation of said associated feeder-circuit-interrupter for connecting said tripping means for energization in accordance with a voltage quantity of the associated feeder circuit, means responsive to said voltage quantity for reclosing said associated feeder-circuit-interrupter, time delay means for delaying a tripping operation of said associated sectionalizing-circuit-interrupter for a time sufficient to permit a normal closing operation of said associated feeder-circuit-interrupter, means responsive to maintenance of voltage on said associated feeder circuit after opening of said associated feeder-circuit-interrupter for introducing a delay in reclosure thereof to permit a tripping operation of said associated sectionalizing-circuit-interrupter, means responsive to an opening operation of said associated sectionalizing-circuit-interrupter for rendering the closing means of said associated feeder-circuit-interrupter ineffective, and means responsive to the presence of voltage on said distribution circuit adjacent said associated feeder-circuit-interrupter for rendering said closing means effective for a closing operation.

9. In an electrical distribution system, a plurality of feeder circuits, a loop distribution circuit connecting said feeder circuits, a separate feeder-circuit-interrupter for controlling the connection of each of said feeder circuits to said distribution circuit, a separate sectionalizing-circuit-interrupter in said distribution circuit between each pair of connections thereto of said feeder circuits, said feeder and sectionalizing circuit interrupters being arranged in pairs each including one of said feeder-circuit-interrupters and an adjacent one of said sectionalizing-circuit-interrupters, and control means for each of said pairs of circuit interrupters, each of said control means including means responsive to current flowing through the associated feeder-circuit-interrupter for opening said associated feeder-circuit-interrupter, tripping means for the associated sectionalizing-circuit-interrupter, means responsive to an opening operation of said associated feeder-circuit-interrupter for connecting said tripping means for energization in accordance with a voltage quantity of the associated feeder circuit, means responsive to said voltage quantity for reclosing said associated feeder-circuit-interrupter, means for delaying energization of said tripping means following an opening operation of said feeder-circuit-interrupter selecting means responsive to voltage on said associated feeder circuit for operation between a first condition and a second condition, means effective when said selecting means is in said first condition and said associated sectionalizing-circuit-interrupter is closed for establishing a first closing circuit for said associated feeder-circuit-interrupter, means effective when said selecting means is in said second condition and said associated sectionalizing-circuit-interrupter is open for establishing a second closing circuit for said associated feeder-circuit interrupter, and means responsive to voltage on said system between said associated circuit interrupters when said associated sectionalizing-circuit-interrupter is open for establishing a third closing circuit for said associated feeder-circuit-interrupter.

FLOYD D. JOHNSON.